United States Patent [19]

Siebels

[11] 4,148,120

[45] Apr. 10, 1979

[54] METHOD OF MANUFACTURING A CATALYST FOR CATALYTIC PURIFICATION OF EXHAUST GASES

[75] Inventor: Johann Siebels, Wolfsburg, Fed. Rep. of Germany

[73] Assignee: Volkswagenwerk Aktiengesellschaft, Wolfsburg, Fed. Rep. of Germany

[21] Appl. No.: 837,389

[22] Filed: Sep. 28, 1977

Related U.S. Application Data

[62] Division of Ser. No. 573,143, Apr. 30, 1975, Pat. No. 4,070,158.

[30] Foreign Application Priority Data

Jul. 16, 1974 [DE] Fed. Rep. of Germany ....... 2434102

[51] Int. Cl.² .................... B23P 15/00; F01N 3/15
[52] U.S. Cl. .................... 29/157 R; 29/446; 29/455 R; 422/122; 138/149
[58] Field of Search ............ 29/157 R, 446, 455; 23/288 FC; 138/171, 170, 149, DIG. 5

[56] References Cited

U.S. PATENT DOCUMENTS

| 3,065,595 | 11/1962 | Gary | 23/288 FC |
|---|---|---|---|
| 3,692,497 | 9/1972 | Keith et al. | 23/288 FC |
| 3,798,006 | 3/1974 | Balluff | 23/288 FC |
| 3,841,842 | 10/1974 | Wiley | 23/288 FC |
| 3,852,042 | 12/1974 | Wagner | 23/288 FC |
| 3,854,888 | 12/1974 | Frietzsche | 29/455 |
| 3,861,881 | 1/1975 | Nowak | 23/288 FC |
| 3,912,459 | 10/1975 | Kearsley | 23/288 FC |
| 3,958,312 | 5/1976 | Weaving et al. | 29/446 |

FOREIGN PATENT DOCUMENTS 2213539 10/1973 Fed. Rep. of Germany ........ 29/157 R

*Primary Examiner*—C. W. Lanham
*Assistant Examiner*—Daniel C. Crane
*Attorney, Agent, or Firm*—Brumbaugh, Graves, Donohue & Raymond

[57] ABSTRACT

A catalytic unit for treating gases, particularly exhaust gases of internal combustion engines, comprising a housing, adapted to be connected in an exhaust gas line, and a monolithic carrier body provided with a catalytic agent. The carrier body is mounted within the housing by an intermediate layer arranged in compression between the circumferential surface of the carrier body and the housing. According to the invention, the intermediate layer is so compressed by the surrounding housing that it exerts a pressure on the surface of the carrier body in the range of 20 to 80 N/cm².

1 Claim, 2 Drawing Figures

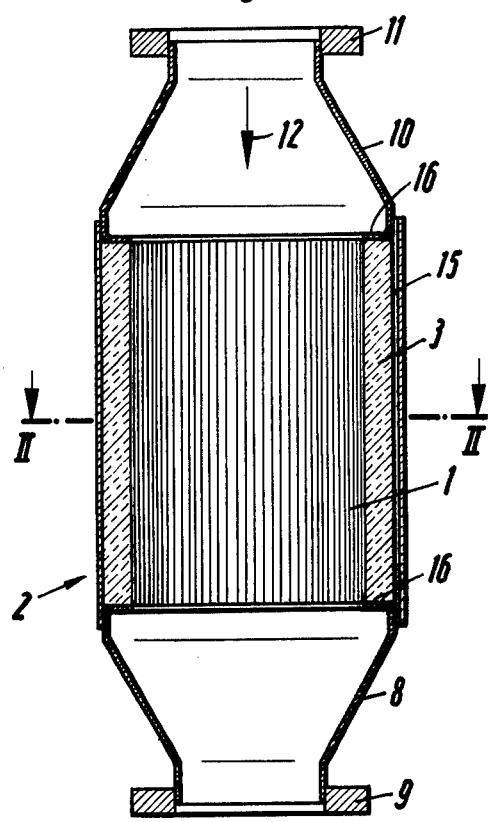
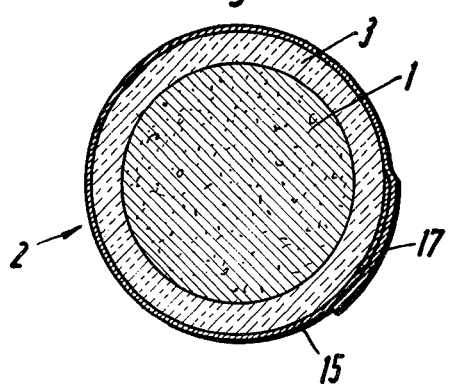

METHOD OF MANUFACTURING A CATALYST FOR CATALYTIC PURIFICATION OF EXHAUST GASES

This is a division of application Ser. No. 573,143 filed Apr. 30, 1975, now U.S. Pat. No. 4,070,158.

BACKGROUND OF THE INVENTION

The present invention concerns a catalyst, adapted for connection into an exhaust gas line, for the catalytic purification of the exhaust gases of an internal combustion engine. More particularly, the invention concerns a catalytic unit having a monolithic catalyst carrier body provided with a suitable catalytic agent. The carrier body is supported in a housing by means of an intermediate layer of material arranged in compression, between the circumferential surface of the carrier body and the housing.

The U.S. patent application Ser. No. 403,270, filed Oct. 3, 1973 by Joachim Neumann (which is commonly assigned with the present application) discloses a method of producing a catalytic unit in which the circumferential surface of a monolithic catalyst carrier body is covered by an intermediate layer of elastic, heat-resistant material, and the package, so formed, is supported in a housing under sufficient radial stress to prevent axial movement of the carrier body during normal operation. The intermediate layer preferably consists of one or more plies of a mat made of a ceramic fiber material; specifically, an aluminumsilicate-fiber material.

In this manner, the catalyst carrier body, which consists of a delicate porous ceramic substance, is safely mounted in a housing and can withstand the high mechanical and thermal stresses which prevail, for example, when the catalytic unit is mounted in an automobile for exhaust gas purification. In addition, arrangement for supporting the carrier body is simple and economical in design.

During operation of catalytic exhaust gas purification units of the type provided with a monolithic carrier body (such body normally consisting of a cylindrical ceramic body having a plurality of continuous channels extending through it in the longitudinal direction), it has been found that cracks or fissures frequently appear in the ceramic material. These fissures, when coupled with the high mechanical stresses, caused especially by vibrations originating with the internal combustion engine of an automobile, result in the destruction of the ceramic body after a comparatively short operating time and thereby render the exhaust gas purification unit inoperative.

Longitudinal fissures in the monolithic carrier body have proven to be particularly problematic. The principal cause of these fissures has been found to be the outer tangential tensile stresses produced by thermal action, especially during engine warm-up periods, which is nonuniform across the monolith cross-section.

SUMMARY OF THE INVENTION

It is a principal object of the present invention to provide a means of reducing the formation of longitudinal fissures, which are created during operation of a catalyst of the aforementioned construction, so as to obtain an exhaust gas purification unit for an internal combustion engine that exhibits both high stability and long life.

This object, as well as other objects which will become apparent in the discussion that follows, are achieved, in accordance with the present invention, by compressing the elastic intermediate layer to such a degree that it exerts a radial pressure on the surface of the carrier body in the range of 20 to 80 N/cm$^2$. The invention is thus based on the concept that the tangential stresses causing the longitudinal fissures in a monolithic carrier body can be compensated, at least in part, by externally generated radial compressive stresses applied to the body. Due to these outside compressive stresses exerted on the carrier body, the critical fissure-producing point is shifted to a higher differential temperature. In this regard, it can be shown that the admissible thermal stress becomes larger with an increase in the applied compressive stress. The upper limit for the application of radial pressure is determined by the compression resistance of the monolithic carrier body; that is, by the strength of its support material. The lower limit of the compression pressure is chosen such that the monolithic carrier body will not be subject to any longitudinal fissures up to a temperature differential of approximately $\Delta T = 600°$ C.

Accordingly, if the clamping pressure of the carrier body remains within the pressure limits of 20 to 80 N/cm$^2$ in accordance with the invention, it is ensured that the monolithic carrier body not only is seated firmly and securely in the housing but also that it possesses a substantial margin of safety against the formation of longitudinal fissures.

In accordance with a preferred embodiment of the present invention, the housing of the catalytic unit is constructed of a cylindrical metal jacket formed of a pre-rolled rectangular metal sheet which is wrapped circumferentially about the carrier and its surrounding elastic intermediate layer with such a force that a radial clamping pressure of 20 to 80 N/cm$^2$ is exerted on the surface of the carrier body.

BRIEF DESCRIPTION OF THE DRAWING

FIG. 1 is a longitudinal sectional view through a catalytic unit for the catalytic purification of exhaust gases of an internal combustion engine.

FIG. 2 is a transverse sectional view through the catalytic unit of FIG. 1 taken along the section line II—II.

DESCRIPTION OF THE PREFERRED EMBODIMENTS

FIGS. 1 and 2 illustrate a catalytic exhaust gas purification unit which comprises a catalyst carrier body 1, frictionally secured in a cylindrical housing 2 by means of an elastic, highly temperature-resistant intermediate layer 3. The monolithic carrier body 1 is formed of a ceramic material and is provided with continuous, axially extending channels as is conventional in the art. The surfaces of these channels are coated with a layer of catalytically active material for effecting the chemical transformation of noxious gas components that are passed therethrough in the direction indicated by the arrow 12.

The transition from the exhaust gas pipe of an internal combustion engine (not shown in the drawing) to the housing 2 accommodating the catalyst body 1 is formed at the in-flow and out-flow ends of the catalytic unit by conical transition members 8 and 10 that are secured to the cylindrical housing 2, for example by welding.

Flanges 9 and 11 are provided to facilitate connection of the respective members 8 and 10 to the exhaust pipe.

In the exemplary embodiment illustrated in FIGS. 1 and 2, the housing 2 consists of a cylindrical metal jacket 15 formed of a wrapped rectangular sheet. The housing 2 is preferably produced in the following manner: The catalyst carrier body 1, surrounded by the compressible, highly temperature-resistant ceramic fiber mat 3, is inserted into a pre-rolled open rectangular metal sheet and the ends 17 of this sheet are subsequently pulled together in a clamping or stretching device or jig so as to tightly surround the carrier body 1 and intermediate layer 3. According to the invention, the two ends 17 of the rectangular metal sheet are pulled together with such a force that a radial pressure is produced within the ceramic fiber mat 3 having a minimum of 20 and maximum of 80 N/cm$^2$. The two overlapping ends 17 of the rectangular metal sheets are thereafter joined together, for example by welding along the exposed longitudinal edge. Finally, the conical transition members 8 and 10 are mounted in place on the cylindrical metal jacket 15 and are also secured by welding. In the exemplary embodiment shown in the drawing, the transition elements 8 and 10 possess collars 16 which project radially inward to cover the frontal surfaces of the ceramic intermediate layer 3.

Tests with catalytic exhaust gas purification units provided with a monolithic ceramic catalyst carrier body which is clamped with radial pressure in the range of 20 and 80 N/cm$^2$ have shown that such units exhibit extremely high stability and long life and are not subject to the formation of longitudinal fissures in the ceramic carrier body. In one example, a monolithic ceramic catalyst carrier body, constructed as a cylinder having a diameter of 4 inches and a length of 6 inches, was surrounded by a ceramic fiber mat and wrapped in a cylindrical metal jacket with a tensional clamping force of approximately 12,000 N (newtons), resulting in a radial clamping pressure of approximately 60 N/cm$^2$ on the circumferential surface of the carrier body. This catalytic unit, so produced, was installed in the internal combustion engine exhaust gas line of an automobile. Even after travel over a distance of 50,000 miles (approximately 80,000 km) the mounting support of the monolithic catalyst carrier body was unimpaired and, more significantly, no longitudinal fissures appeared in the carrier body.

It will be understood that the present invention is susceptible to various modifications, changes and adaptations which fall within its spirit and scope. Accordingly, it is intended that the present invention be defined and delimited only by the following claims and their equivalents.

I claim:

1. A method of manufacturing a catalytic unit for the catalytic purification of exhaust gases from an internal combustion engine, comprising the steps of:

covering with an elastic intermediate layer an outer circumferential surface of a monolithic carrier body provided with a catalytic agent;

arranging the covered body on a pre-rolled rectangular piece of sheet metal;

wrapping said rectangular piece of sheet metal around the covered body and pulling the ends of the piece together in a jig or stretching device so as to exert a radial pressure on the surface of said carrier body in the range of 20 to 80 N/cm$^2$; and fastening the overlapping ends of said piece of sheet metal together.

* * * * *